United States Patent
Stamey, Jr. et al.

(10) Patent No.: US 7,083,514 B1
(45) Date of Patent: Aug. 1, 2006

(54) AIR-FILTRATION SYSTEM FOR VEHICLE OPERATOR

(75) Inventors: Willie L. Stamey, Jr., Kings Mountain, NC (US); Gregory K. Rhyne, Denver, NC (US); Jim Strasser, Mooresville, NC (US)

(73) Assignee: Wix Filtration Corp., Gastonia, NC (US)

( * ) Notice: Subject to any disclaimer, the term of this patent is extended or adjusted under 35 U.S.C. 154(b) by 0 days.

(21) Appl. No.: 10/973,428

(22) Filed: Oct. 27, 2004

Related U.S. Application Data

(60) Provisional application No. 60/514,685, filed on Oct. 28, 2003.

(51) Int. Cl.
*A24C 5/04* (2006.01)

(52) U.S. Cl. .......................... 454/156; 2/171.3; 62/61; 128/201.22

(58) Field of Classification Search ................ 454/131, 454/132, 135, 156; 128/201.22, 201.23; 55/385.1; 62/61; 2/171.3
See application file for complete search history.

(56) References Cited

U.S. PATENT DOCUMENTS

| | | | | |
|---|---|---|---|---|
| 3,413,972 A | * | 12/1968 | Depping | 128/201.23 |
| 3,773,044 A | * | 11/1973 | Wallace | 128/202.22 |
| 4,502,480 A | * | 3/1985 | Yamamoto | 128/201.15 |
| 4,787,925 A | * | 11/1988 | Ansite | 55/496 |
| 5,120,334 A | | 6/1992 | Cooper | |
| 5,146,757 A | * | 9/1992 | Dearing | 62/61 |
| 5,192,346 A | | 3/1993 | Kowalczyk | |
| 5,350,444 A | | 9/1994 | Gould et al. | |
| 5,554,205 A | | 9/1996 | Ernst et al. | |
| 2002/0139251 A1 | | 10/2002 | Simmons | |
| 2003/0098143 A1 | * | 5/2003 | Winkle | 165/46 |
| 2003/0131732 A1 | | 7/2003 | Kim | |
| 2004/0255364 A1 | * | 12/2004 | Feher | 2/171.3 |

* cited by examiner

*Primary Examiner*—Gregory Wilson
(74) *Attorney, Agent, or Firm*—Berenato, White & Stavish LLC

(57) ABSTRACT

An air-filtration system is provided for use in a vehicle for delivering air to a helmet worn by a vehicle operator. The air-filtration system comprises an air intake in the form of a window scoop for drawing exterior air, an air duct assembly for delivering air from the air intake to the helmet worn by the vehicle operator, and an air filter assembly disposed in-line with the air duct assembly between the air intake and the helmet. The air filter assembly includes a catalyst member for converting carbon monoxide to carbon dioxide, and a particulate filter member.

20 Claims, 3 Drawing Sheets

AIR-FILTRATION SYSTEM FOR VEHICLE OPERATOR

CROSS-REFERENCE TO RELATED APPLICATION

This Application claims the benefit under 35 U.S.C. 119(e) of U.S. Provisional Application No. 60/514,685 filed Oct. 28, 2003 by Willie L. Stamey, Jr.

BACKGROUND OF THE INVENTION

1. Field of the Invention

The present invention relates to air-delivery systems of an interior of vehicles in general, and, more particularly, to an air-filtration system for delivering air piped to a helmet worn by a vehicle operator.

2. Description of the Prior Art

Typically, the only air that vehicle driver and passengers can breath is the air in a motor vehicle that enters a passenger compartment of the vehicle through inlets in windows and/or a heating-cooling system. That outside air, which the driver and passengers breath is heavily polluted by the exhaust, fumes emitted from the motors of motor vehicles, and allergens-pollen. Certain occupations, such as car racing, require the vehicle operator spend many hours in the motor vehicles while inhaling polluted air. During a race, carbon monoxide builds up in the race car and in the driver's blood. Long-term exposure to carbon monoxide results in serious health issues.

Therefore, a need exists to develop an air-filtration system for use in a vehicle that advances the art.

SUMMARY OF THE INVENTION

The present invention provides an air-filtration system for use in a vehicle, such as for a vehicle equipped with an internal combustion engine. The air-filtration system delivers outside air to a helmet of a vehicle operator, such as a vehicle driver or navigator. The present invention was developed to help control the vehicle operator's, especially a race car driver's, exposure to carbon monoxide, noxious fumes and particulate matter.

The air-filtration system of the present invention comprises an air intake for drawing exterior air, an air duct assembly for delivering air from the air intake to the helmet worn by the vehicle operator, and an air filter assembly disposed in-line with the air duct assembly between the air intake and the helmet. The air filter assembly includes a filter housing and a layered filter element assembly disposed within the filter housing. The filter element assembly is clamped between clamshell halves of the filter housing.

The filter element assembly includes a layer of catalyst, a particulate filter member and a carbon/charcoal foam pad. The layer of catalyst is provided for converting carbon monoxide to carbon dioxide. The particulate filter member is provided for removing particulate matters and/or odor from the outside air. The carbon charcoal foam pad is provided as an option for additional odor removal.

Optionally, the air-filtration system of the present invention may include a cooler provided for cooling the outside air before delivering it to the vehicle operator.

Therefore, the air-filtration system for the operator of the vehicle in accordance with the present invention represents a novel arrangement of the air-filtration system for use in the vehicle for delivering air to a helmet worn by the vehicle operator, comprising an air intake for drawing exterior air, an air duct assembly for delivering air from said air intake to the helmet worn by the vehicle operator, and an air filter assembly. The present invention is particularly helpful in controlling the race car driver's exposure to carbon monoxide, noxious fumes, and particulate matters.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings.

Figure 1:
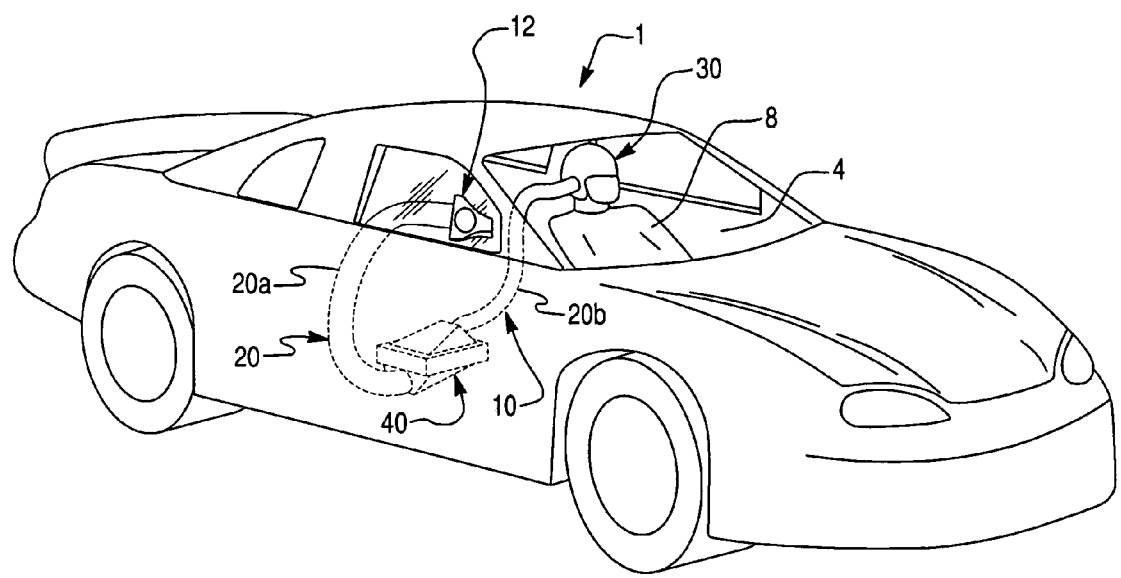
FIG. 1 is a perspective view from of an air filtration system in accordance with the first exemplary embodiment of the present invention.

FIG. 1 illustrates a vehicle 1 equipped with an air filtration system 10 in accordance with a first exemplary embodiment of the present invention. Preferably, the air filtration system 10 is adapted to be used with a motor vehicle having an internal combustion engine (not shown), such as a race or sports car. It will be appreciated that the air filtration system of the present invention may be used in any vehicle (land, see or airborne) whose operators are exposed to harmful gases, such as carbon monoxide, noxious fumes and particulate matter.

The racing car has a vehicle body 2 forming an enclosed passenger compartment 4. As illustrated, the vehicle body 2 is provided with glass or plastic windows 6. The passenger compartment 4 defines a space therewithin for a vehicle operator 8, such as vehicle driver or a vehicle navigator. It will be appreciated that there is substantially no pressure difference inside and outside of the passenger compartment 4. As illustrated in FIG. 1, the vehicle operator 8 wears a helmet 30 for protecting a head of the vehicle operator 8 from injuries resulting from an impact in case of an accident, such as a frontal collision.

The air-filtration filtration system 10 comprises an air intake 12 in the form of a window scoop, an air duct assembly 20 leading from the air intake 12 to the operator's helmet 30, and an air filter assembly 40 disposed in-line with the duct assembly 20 between the air intake 12 and the helmet 30. As illustrated in FIG. 1, the duct assembly 20 includes a first duct 20a directly connected to the air intake 12 without any air processing apparatus therebetween, and fluidly connecting the air intake 12 to the filter assembly 40 and a second duct 20b fluidly connecting the filter assembly 40 to the operator's helmet 30.

The window scoop 12 is mounted to one of the windows 6 of the vehicle body 2 to feed outside air to the helmet 30 through the air duct assembly 20. Preferably, as illustrated in FIG. 1, the window scoop 12 is mounted to a passenger-side window.

The air filter assembly 40 is, preferably, mounted to the vehicle floor adjacent the operator 8. Alternatively, the air filter assembly 40 may be mounted to any other appropriate location within the vehicle 1 that does not hamper air deliver to the vehicle operator 8 is suitable. Design considerations include the volume of airflow and the amount of dust or particulate that is delivered to the driver.

Figure 2:
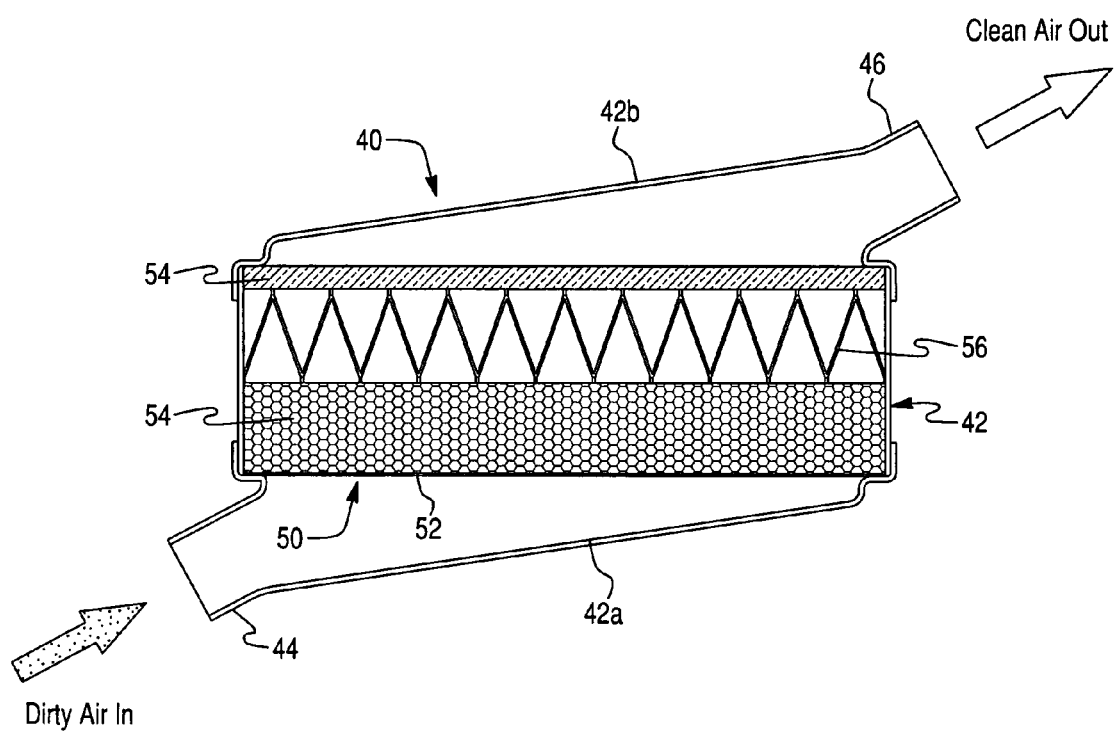
FIG. 2 is a cross sectional view of a filter assembly of the air filtration system in accordance with the preferred embodiment of the present invention.

The preferred embodiment of the air filter assembly 40 is illustrated in FIG. 2. The air filter assembly 40 includes a filter housing 42 and a layered filter element assembly 50 disposed within the filter housing 42. The filter housing 42 is provided with an inlet 44 for receiving the dirty, polluted outside air and an outlet 46 leading to the driver's helmet. More specifically, the inlet 44 of the air filter assembly 40 is connected to the window scoop 12 through the first duct 20a, while the outlet 46 is connected to the helmet 30 through the second duct 20b. The filter housing 42 comprises two clamshell halves: a bottom portion 42a including the inlet 44, and a top portion 42b including the outlet 46 and mounted to the bottom portion 42a for forming a filter chamber therebetween that accommodates the filter element assembly 50. The filter element assembly 50 is interposed between the inlet and outlet sides 42a and 42b of the filter housing 42.

The filter element assembly 50 includes one or more different media. Preferably, the filter element assembly 50 includes a wire mesh 52 at the inlet 44, a layer of catalyst 54, a particulate filter member 56 and an optional carbon/charcoal foam pad 58. The layer of catalyst 54 is provided for converting carbon monoxide to carbon dioxide. The particulate filter member 56 is provided for removing particulate matters and/or odor from the outside air. The carbon charcoal foam pad 58 is provided for additional odor removal. The filter element assembly 50 is clamped between the clamshell halves 42a and 42b of the filter housing 42.

The design of the filter housing provides low air flow resistance and the filter is designed to meet catalyst area requirements. Preferably, an alumina catalyst (e.g., nickel oxide) or similar catalyst is used to convert carbon monoxide to carbon dioxide. More preferably, as shown in FIG. 2, the layer of catalyst 54 is in the form of beads of catalytic material supported by the wire mesh 52.

Further preferably, the particulate filter member 56 is in the form a pleated air filter element made of a filter paper or a nonwoven material that is folded in an accordion shape. The air filter element 56 may be provided with or without activated charcoal carbon powder for absorbing hydrocarbons and odors from the polluted outside air. The air filter element 56 is provided with a surrounding seal (not shown).

Those skilled in the art will appreciate in view of this disclosure that an air filter assembly 40 according to the present invention may be configured according to a variety of designs.

In operation, the polluted outside air flows substantially unrestricted through the window scoop 12 at the race car 1 passenger window 6 into the air duct assembly 20. The polluted outside air then flows through the air duct assembly 20 into the inlet 44 of the air filter assembly 40. Within the air filter assembly 40, the polluted outside air first flows through the layer of catalyst 54 where the carbon monoxide is converted to carbon dioxide. Next, the air passes through the odor/particulate pleated air filter element 56 and then through the carbon/charcoal foam pad 58. The clean air then exits through the outlet 46 of the air filter assembly 40. Once processed in this manner, the clean air is delivered to the vehicle operator's helmet where the cleaned air is available to the vehicle operator for breathing.

Figure 3:
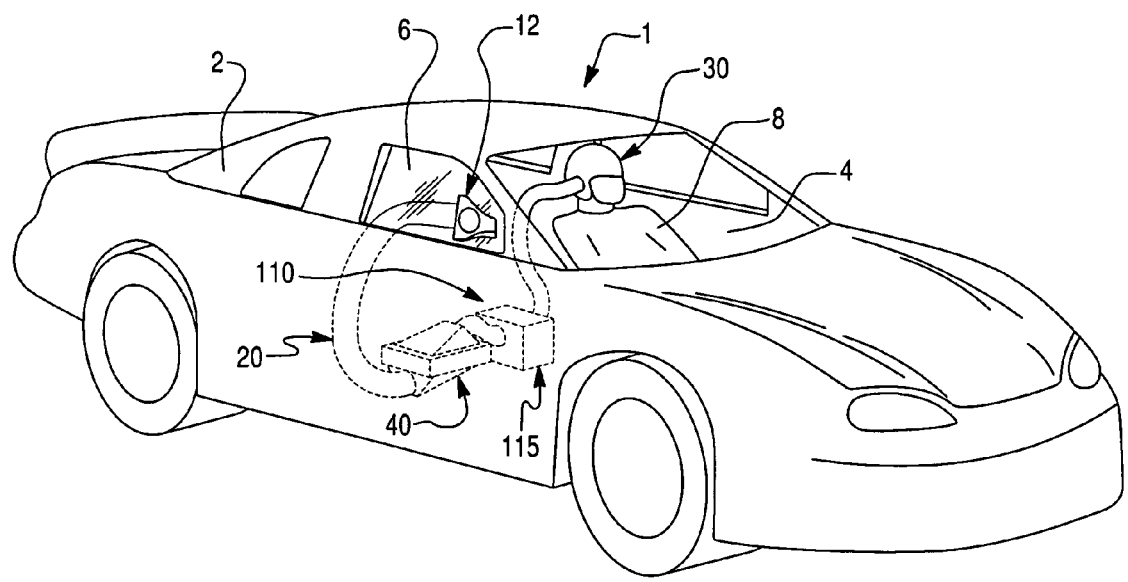
FIG. 3 is a perspective view from of an air filtration system in accordance with the second exemplary embodiment of the present invention.

FIG. 3 of the drawings depicts a second exemplary embodiment of the air-filtration system of the present invention generally designated with the reference numeral 110. Components, which are unchanged from, or function in the same way as in the first exemplary embodiment depicted in FIGS. 1 and 2 are labeled with the same reference numerals, sometimes without describing detail since similarities between the corresponding parts in the two embodiments will be readily perceived by the reader.

As illustrated in FIG. 3, the air-filtration system 110 of the second exemplary embodiment of the present invention comprises an air intake 12 in the form of a window scoop, an air duct assembly 20 leading from the air intake 12 to the operator's helmet 30, an air filter assembly 40 disposed in-line with the duct assembly 20 between the air intake 12 and the helmet 30, and an air cooler 115 provided for cooling the outside air before delivering it to the vehicle operator 8.

Preferably, the air cooler 115 is located upstream of the air filter assembly 40 for cooling the filtered air through the air cooler 115 before delivering the filtered air to the helmet 30. The air cooler 115 may be in the form of any appropriate air-cooling apparatus known to those skilled in the art. The provision of the air cooler 115 depends on a specific vehicle design and application.

In operation, the polluted outside air flows into the window scoop 12 at the race car 1 passenger side window 6. The polluted outside air then flows through the air duct assembly 20 into the inlet 44 of the air filter assembly 40. Within the air filter assembly 40, the polluted outside air first flows through the layer of catalyst 54 where the carbon monoxide is converted to carbon dioxide. Next, the air passes through the odor/particulate pleated air filter element 56 and then through the carbon/charcoal foam pad 58. The clean air then exits through the outlet 46 of the air filter assembly 40, and is delivered through the air cooler 115. Once processed in this manner, the clean air is delivered to the vehicle operator's helmet where the cleaned and cooled air is available to the vehicle operator for breathing.

Therefore, the air-filtration system for the operator of the vehicle in accordance with the present invention represents a novel arrangement of the air-filtration system for use in the vehicle for delivering air to a helmet worn by the vehicle operator, comprising an air intake for drawing exterior air, an air duct assembly for delivering air from said air intake to the helmet worn by the vehicle operator, and the air filter assembly. Optionally, the air-filtration system of the present invention may be provided with the air cooler. The present invention is particularly helpful in controlling the race car driver's exposure to carbon monoxide, noxious fumes, and particulate matters.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. An air-filtration system in a vehicle having a body defining a space therewithin for accommodating a vehicle operator, said system provided for delivering outside air to a helmet worn by said vehicle operator for breathing, said system comprising:
   an air intake for drawing exterior air, said air intake mounted to said body of said vehicle;
   an air duct assembly for delivering air from outside of said vehicle through said air intake to said helmet worn by said vehicle operator for breathing by said vehicle operarator; and
   an air filter assembly disposed in-line with said air duct assembly between said air intake and said helmet.

2. The air-filtration system as defined in claim 1, wherein said air duct assembly includes a first duct fluidly connecting said air intake to said air filter assembly and a second duct fluidly connecting said air filter assembly to said helmet.

3. The air-filtration system as defined in claim 1, wherein said air filter assembly includes a catalyst member for converting carbon monoxide to carbon dioxide.

4. The air-filtration system as defined in claim 1, wherein said air filter assembly includes a particulate filter member.

5. The air-filtration system as defined in claim 4, wherein said particulate filter member is a pleated air filter element.

6. The air-filtration system as defined in claim 1, wherein said air filter assembly includes a carbon charcoal pad for odor removal.

7. The air-filtration system as defined in claim 1, wherein said air filter assembly includes a catalyst member for converting carbon monoxide to carbon dioxide and a particulate filter member.

8. The air-filtration system as defined in claim 7, wherein said air filter assembly further includes a carbon charcoal pad for odor removal.

9. The air-filtration system as defined in claim 8, wherein said particulate filter member is disposed between said catalyst member and said carbon charcoal pad.

10. The air-filtration system as defined in claim 7, wherein said catalyst member is disposed adjacent to an inlet of said air filter assembly.

11. The air-filtration system as defined in claim 1, further comprising an air cooler disposed in-line with said air duct assembly between said air intake and said helmet.

12. The air-filtration system as defined in claim 11, wherein said air cooler is disposed upstream of said air filter assembly for cooling filtered air through said air cooler before delivering filtered air to said helmet.

13. The air-filtration system as defined in claim 1, wherein said vehicle is a racing car.

14. The air-filtration system as defined in claim 1, wherein said vehicle operator is a driver of said vehicle.

15. The air-filtration system as defined in claim 1, wherein said air intake is mounted to a window of said body of said vehicle.

16. The air-filtration system as defined in claim 15, wherein said air intake includes a window scoop mounted to said window of said body of said vehicle.

17. The air-filtration system as defined in claim 15, wherein said air filter assembly is mounted to said body of said vehicle.

18. The air-filtration system as defined in claim 1, wherein there is substantially no pressure difference inside and outside said vehicle.

19. The air-filtration system as defined in claim 1, wherein said air intake is directly connected to said air duct assembly and provides substantially unrestricted air flow therethrough.

20. The air-filtration system as defined in claim 1, wherein said air intake is directly connected to said air duct assembly without any air processing apparatus therebetween.

* * * * *